United States Patent [19]

Ohya et al.

[11] Patent Number: 4,567,090

[45] Date of Patent: Jan. 28, 1986

[54] HEAT-RESISTANT LAMINATE FILM

[75] Inventors: Masaki Ohya; Yoshihiro Matsukura, both of Iwaki, Japan

[73] Assignee: Kureha Kagaku Kogyo Kabushiki Kaisha, Tokyo, Japan

[21] Appl. No.: 721,793

[22] Filed: Apr. 10, 1985

[30] Foreign Application Priority Data

Aug. 21, 1979 [JP] Japan .................................. 54-106584
Jul. 25, 1983 [JP] Japan .................................. 58-124646
Apr. 11, 1984 [JP] Japan .................................. 59-72433

[51] Int. Cl.$^4$ .............................................. B32B 7/02
[52] U.S. Cl. ....................................... 428/214; 428/35; 428/213; 428/215; 428/332; 428/424.2; 428/424.6; 428/522; 428/337; 428/339
[58] Field of Search ................. 428/424.2, 522, 424.6, 428/516, 518, 35, 214, 213, 215, 332, 339, 337

[56] References Cited

U.S. PATENT DOCUMENTS

| | | | |
|---|---|---|---|
| 3,887,755 | 6/1975 | Zamer | 428/424.6 |
| 3,900,616 | 8/1975 | Moore | 428/424.6 |
| 3,903,351 | 9/1975 | Ando et al. | 428/424.6 |
| 4,296,156 | 10/1981 | Lustig et al. | 428/518 |
| 4,379,117 | 4/1983 | Baird et al. | 428/518 |
| 4,448,792 | 5/1984 | Schirmer | 428/35 |

FOREIGN PATENT DOCUMENTS 106584 of 1979 Japan.
124646 of 1983 Japan.

Primary Examiner—Edith Buffalow
Attorney, Agent, or Firm—Michael N. Meller

[57] ABSTRACT

Disclosed herein is a heat-resistant laminate film comprising a gas-barrier layer of a copolymer of vinylidene chloride and at least one comonomer copolymerizable with vinylidene chloride, outer layers of polypropylene and two adhesive layers of polyolefin modified by acid and thermoplastic polyurethane, disposed between any of the above layers and bonded with each other, the modified polyolefin adhesive layer being bonded to the outer layer and the thermoplastic polyurethane adhesive layer being bonded to the gas-barrier layer.

5 Claims, No Drawings

HEAT-RESISTANT LAMINATE FILM

BACKGROUND OF THE INVENTION

The present invention relates to a heat-resistant laminate showing excellent gas-barrier property and an oilresistance at high temperature, and capable of enduring retort treatment at high temperature. More particularly, the present invention relates to a heat-resistant laminate film comprising outer layers of polypropylene, a layer of a vinylidene chloride copolymer and two adhesive layers of heat-resistant polyolefin and thermoplastic polyurethane, disposed between any of the above layers.

Recently, gas impermeable laminates capable of enduring boiling or retort treatment have been used in the field of food packaging. However, as the conditions for the treatment have become more and more severe, it has been demanded to dispose therebetween, in such laminates, adhesive layers capable of retaining good bonding strength at high temperature. However, many of conventional adhesives including ethylene—vinyl acetate copolymers are lack of the heat-resistance and accordingly, laminates having adhesive layers showing higher heat-resistance have been desired. As a laminate having the adhesive layers showing such heat-resistance Japanese Patent Application Laid-Open No. 54-30272 (1979) discloses a laminate film comprising outer layers of a polyolefin, a layer of vinylidene chloride synthetic resin and specific adhesive layers. However, the disclosed laminate film does not always exhibit good adhesive property under severe conditions such as retort treatment at a high temperature, for example, more than 120° C. for a long time and accordingly, gas-impermeable laminates showing excellent adhesive property and heat-resistance have been demanded.

As the result of a study, the present inventors have found that a heat-resistant laminate film showing excellent gas-barrier property and an oil-resistance at high severe temperature, and having sufficiently practical interlaminar adhesive strength which is maintained even after the retort treatment for a long time at a temperature of more than 120° C. and is increased with elapse of time, can be obtained by disposing two specific adhesive layers between heat-resistant resin layers as the outer layers and vinylidene chloride copolymer as the gas-barrier layer, that is, by disposing two adhesive layers comprising a layer of polyolefin modified by acid and a layer of thermoplastic polyurethane between the outer layers and the gas-barrier layer, and have attained the present invention on the basis of the above-mentioned finding.

SUMMARY OF THE INVENTION

In an aspect of the present invention, there is provided a heat-resistant laminate film comprising a gasbarrier layer of a copolymer of vinylidene chloride and at least one comonomer copolymerizable with vinylidene chloride, outer layers of polypropylene and two adhesive layers of polyolefin modified by acid and thermoplastic polyurethane disposed between any of the above layers and bonded with each other, the modified polyolefin adhesive layer being bonded to the outer layer and the thermoplastic polyurethane adhesive layer being bonded to the gas-barrier layer.

DETAILED DESCRIPTION OF THE INVENTION

A heat-resistant laminate film of the present invention comprises a gas-barrier layer(D) of a copolymer of vinylidene chloride and at least one comonomer copolymerizable with vinylidene chloride, outer layers(A) of polypropylene and two adhesive layers of polyolefin modified by acid and thermoplastic polyurethane disposed between any of the above layers and bonded with each other, the modified polyolefin adhesive layer(B) being bonded to the outer layer and the thermoplastic polyurethane adhesive layer (C) being bonded to the gas-barrier layer, and the heat-resistant laminate film of the present invention is produced by coextruding the above resin layers in the order of A/B/C/D/C/B/A.

As the polypropylene for both of the outer layers (A) in the laminate according to the present invention, propylene homopolymer or propylene-ethylene copolymer containing more than 90% by weight of propylene can be mentioned.

The outer layers are necessary for providing the heat-resistant property and oil-resistant property and, desirably, have crystal melting point of from 135° C. to 165° C.

For the vinylidene chloride copolymer as the barrier layer (D) in the present invention, a vinylidene chloride copolymer comprising from 65 to 95 % by weight of vinylidene chloride and from 5 to 35 % by weight of at least one comonomer selected from unsaturated monomers copolymerizable therewith can be used. As the monomer copolymerizable with vinylidene chloride, vinyl chloride, acrylonitrile, acrylic ester, acrylic acid, etc. can be mentioned. Further, the vinylidene chloride copolymer may contain known additives, for example, dibutyl sebacate, epoxidized soybean oil or the like. By the use of one layer of vinylidene chloride copolymer, a laminate having gas-barrier property of less than 150 cc/m$^2$.24 hr.atm. can be obtained.

The characteristic feature of the present invention lies in the disposition of two specific adhesive layers between the gas-barrier layer of the vinylidene chloride copolymer and the outer layers of the polypropylene in order to improve the adhesive property. Since the polypropylene as the outer layers and the vinylidene chloride copolymer as the gas-barrier layer have only poor adhesive strength between each other, no sufficient heat-resistant adhesive strength has been provided with the known adhesive agents under severe conditions when only one adhesive layer is disposed therebetween. According to the present invention, an excellent heat-resistant laminate can be obtained by disposing two adhesive layers therebetween, comprising the adhesive layer (B) with a strong adhesive strength to the polypropylene outer layer and the adhesive layer (C) with a strong adhesive strength to the vinylidene chloride copolymer layer, the layers (B) and (C) being firmly bonded with each other.

As the adhesive resin of the layer (B), polyolefin resin modified by acid inseparably bonding with the polypropylene can be used. The polyolefin modified by acid usable herein includes acid-modified resins or the metal salts thereof prepared by modifying a polyolefin with an unsaturated carboxylic acid such as acrylic acid, methacrylic acid, maleic acid, maleic anhydride, etc. (e.g., by graft polymerization).

As the metal component for the metal salts, alkali metal such as Na and K or alkaline earth metal such as Zn and Ca is preferred. As the polyolefin, for example, polyethylene, polypropylene may be mentioned, with polypropylene being particularly preferred. The suitable content of the unsaturated carboxylic acid is less than 10% by weight and, preferably from 0.02 to 7.5% by weight based on the acid-modified resin. As the acid-modified polyolefin, ADMER® and MODIC® which are commercially available are preferred.

As the adhesive agent of the layer (C), thermoplastic polyurethane is used. As the thermoplastic polyurethane, thermoplastic linear polyurethane elastomers applicable with ordinary plastic molding process can be used. A polyurethane prepared by reacting a hydroxy-containing linear compound such as dihydroxypolyethylene adipate, dihydroxypolybutylene adipate, dihydroxypolyhexamethylene adipate, polytetramethylene ether glycol, dihydroxypolycaprolacton and the like with an organic diisocyanate by a known means, is preferably used. As the chain extender, 1,4-butylene glycol, p-xylene glycol, bis($\beta$-hydroxyethoxy)benzene or the like can also be used. As the organic diisocyanate, diphenylmethane-4,4'-diisocyanate, 1,6-hexamethylene diisocyanate and toluylene diisocyanate can be used preferably. As such thermoplastic polyurethane, PARAPLENE® is preferable, and other FDA-approved aliphatic polyurethane adhesive may be used.

The laminate according to the present invention is prepared by laminating the layers A, B, C and D of the aforementioned composition in the order of A/B/C/D/C/B/A. The laminate film obtained by laminating the respective layers in this order has a good heat-resistance and a strong interlaminar adhesive strength, since the outer layer (A) is composed of highly heat-resistant polypropylene, the layer (B) is inseparably bonded with the layer (A), the layer (D) as the gas-barrier layer is firmly bonded with the layer (C) and the layers (B) and (C) are firmly bonded with each other. In addition, since the layer (B) in adjacent with the outer layers shows particularly heat-resistant and the layer (C) shows also relatively heat-resistant, the laminate according to the present invention results in no delamination even under severe processing conditions such as in the oil treatment at high temperature and retort treatment under a pressure. Further, the present invention also has a merit of increasing the interlaminar adhesive strength with the elapse of time by using the layers (B) and (C) as the adjacent adhesive layers. This seems to be attributable to the fact that the polyolefin modified by acid and the thermoplastic polyurethane cause a further reaction at their interface thereby increasing the adhesive strength.

The total thickness of the laminate film is preferably from 40 to 1000$\mu$, in which the thickness of the layer (A) is 25-950$\mu$, the thickness of the layer (B) is 1-50$\mu$, the thickness of the layer (C) is 1-50$\mu$ and the thickness of the layer (D) is 5-100$\mu$. Although the layers (A), (B) and (C) which construct a pair of layers, respectively may be identical with or different from each other in each pair with respect to the kind and the thickness, it is desired that the pairs of layers are identical with each other in view of the production.

The laminate according to the present invention can be prepared by the generally known process. Namely, respective polymer resins are melted by using four extruders and then are coextruded into a laminate of a tubular configuration by using a circular die in the case of a tubular laminate, or a laminate of a sheet-like configuration by using a T-die in the case of a sheet-like laminate.

The laminate obtained in this way according to the present invention is suitable for the retort packaging of foods containing fat at high temperature, for example, by making a thin film into a pouch and subjecting to retort treatment or by deep-drawing a thick film and subjecting to retort treatment while canning foods therein. Further, the laminate is also applicable as the bottles for use in hot filling and retort treatment by means of blow molding.

As described above, the laminate according to the present invention has excellent heat-resistance and gas-barrier property and can be heat-sealed due to the excellent adhesive property, as well as has excellent transparency.

The present invention is explained in more detail in the following Examples; however, it should be recognized that the scope of the present invention is not restricted to these Examples.

EXAMPLE 1-3

Respective polymer resins were extruded separately in four extruders, and molten resins are introduced into a T-die and coextruded into a laminate.

Table 1 shows the composition for each of the layers and the interlaminar adhesive strength thereof. In this case, the thickness for each of the layers: A/B/C/D/C/B/A was 350$\mu$/20$\mu$/20$\mu$/50$\mu$/20$\mu$/20$\mu$/350$\mu$, respectively, with the total thickness being 830$\mu$. The results of the interlaminar adhesive strength are shown in Table 1.

The method of measuring the interlaminar adhesive strength is as follows.

(1) Adhesive strength change during the aging: The laminate was left under the ambient temperature and moisture after production and the interlaminar adhesive strength after one and 10 days from the production was measured.

(2) Lard oil immersion at 95° C. for 120 min: The laminate was cut into 10 cm square and then immersed in lard oil at 95° C. for 120 min, and the interlaminar adhesive strength was measured at the ambient temperature after cooling.

(3) Retort treatment at 120° C. for 30 min: The laminate was cut into 10 cm square and then subjected to retort treatment in a water at 120° C. for 30 min under the pressure, and the interlaminar adhesive strength was measured at the ambient temperature after cooling.

(4) High retort treatment at 130° C. for 5 min: The laminate was cut into 10 cm square and then subjected to retort treatment in a water at 130° C. for 5 min under the pressure, and the interlaminar adhesive strength was measured under ambient temperature after cooling.

Indication for the interlaminar adhesive strength (according to JIS Z-1521) : The interlaminar adhesive strength between the layers (A) and (D) of a rectangular-shaped laminate cut into 20 mm width was measured by T (180°) peeling method using an Instron and it was indicated by the tension (g/20 mm width).

Each of the interlaminar adhesive strength in (2), (3) and (4) is the value after 10 days from the production.

EXAMPLE 4

By using five extruders five kinds of molten resins are introduced into a T-die to obtain a laminate film in the order of A/B/C/D/C/B/A'.

In this case, the thickness for each of the layers was 600μ/20μ/20μ/50μ/20μ/20μ/50μ, respectively, with the total thickness being 780μ. The result for the estimation of the interlaminar adhesive strength is as shown in Table 1 demonstrating that the laminate could sufficiently withstand sterilization at high temperature.

COMPARATIVE EXAMPLE 1

In the same procedures as in Example 1, a laminate of the layer structure shown in Table 1 was obtained. The thickness for each of the layers is identical with that in Example 1. In the Comparative Example 1, an ethylene-vinyl acetate copolymer as the low melting adhesive resin was used instead of the thermoplastic polyurethane for the layer (C), in which the heat-resistance and the oilresistance of the laminate were poor, although the interlaminar adhesive strength in case of no retort treatment was sufficient.

COMPARATIVE EXAMPLE 2

Using four extruders, a laminate of five-layered structure shown in Table 1 was obtained. The laminate of Comparative Example 2 lacked the layer (B) and the thickness for each of the layers A/C/D/C/A was 350μ/20μ/50μ/20μ/350μ respectively. The value for the interlaminar adhesive strength is shown in Table 1. Without layer (B), the laminate was poor in the adhesive property between the layers (A) and (D) and could not be put to practical use.

COMPARATIVE EXAMPLE 3

By using an adhesive layer composed of a mixture of 2 parts by weight of ethylene—ethylacrylate copolymer and 8 parts by weight of polypropylene modified by acid, the laminate was prepared in the same procedures as in Comparative Example 2. The thickness for each of the layers was the same as that in the Comparative Example 2. The value for the interlaminar adhesive strength is shown in Table 1. The laminate of the Comparative Example 3 was poor in the heatresistant adhesive property and could not attain the purpose of the present invention.

TABLE 1

| | | | | | | | | Interlaminar adhesive strength (gr/20 mm width) | | | |
| --- | --- | --- | --- | --- | --- | --- | --- | --- | --- | --- | --- |
| | | | | | | | Change during the aging | | Lard oil immersion at 95° C. × 120 min. | Retort treatment at 120° C. × 30 min. | High retort treatment at 130° C. × 5 min. |
| | A layer | B layer | C layer | D layer | C layer | B layer | A or A' layer | one day after | 10 days after | | | |
| Example | | | | | | | | | | | | |
| 1 | FA-6411*1 | P300M*3 | TPU*4 | PVDC*6 | TPU | P300M | FA-6411 | 400 | 3200 | 2000 | 1600 | 1200 |
| 2 | FA-6411 | QF500*7 | TPU | PVDC | TPU | QF500 | FA-6411 | 300 | 3000 | 2000 | 1500 | 1100 |
| 3 | FS-2011*2 | P300M | TPU | PVDC | TPU | P300M | FS-2011 | 400 | 2500 | 1500 | 1300 | 980 |
| 4 | FS-2011 | P300M | TPU | PVDC | TPU | P300M | FA-6411 | 400 | 3200 | 1700 | 1000 | 750 |
| Comparative Example | | | | | | | | | | | | |
| 1 | FA-6411 | P300M | EVA*5 | PVDC | EVA | P300M | FA-6411 | 1500 | 1300 | 100 | 100 | 20 |
| 2 | FA-6411 | — | TPU | PVDC | TPU | — | FA-6411 | 20 | 20 | 10 | delaminated | delaminated |
| 3 | FA-6411 | — | EEA*8/QF500 | PVDC | EEA/QE500 | — | FA-6411 | 30 | 30 | 10 | 10 | delaminated |

Note:
*1propylene - ethylene copolymer (manufactured by Sumitomo Chemical Co., Ltd., Sumitomo NOBLEN FA-6411)
Melt Index: 7 gr/10 min.
Crystal melting point: 145° C.
Density: 0.9 gr/cm$^3$
*2polypropylene (manufactured by Sumitomo Chemical Co., Ltd., Sumitomo NOBLEN FS-2011)
Melt Index: 2 gr/10 min.
Crystal melting point: 165° C.
Density: 0.91 gr/cm$^3$
*3polypropylene modified by acid (manufactured by Mitsubishi Petrochemical Co., Ltd., MODIC P-300M)
Melt Index: 10 gr/10 min.
Crystal melting point: 153° C.
Density: 0.89 gr/cm$^3$
*4Thermoplastic polyurethane elastomer (containing adipic acid polyester unit) (manufactured by Nippon Elastoran K.K. PARAPLENE P 25M)
Softening point: 130° C.
Density: 1.21 gr/cm$^3$
*5Ethylene-vinyl acetate copolymer (manufactured by Sumitomo Chemical Co., Ltd., EVATATE H1011 (VAC 15 %))
Melt Index: 0.6 gr/10 min.
Crystal melting point: 86° C.
Density: 0.94 gr/cm$^3$
*6Vinylidene chloride-Vinyl chloride copolymer (83/17 % by weight): 100 parts by weight
dibutyl sebacate: 1 parts by weight
epoxydized soybean oil: 2 parts by weight
*7Polypropylene modified by acid (manufactured by Mitsui Petrochemical Industries, Ltd., ADMER QF500)
Melt Index: 4.7 gr/10 mon.
Crystal melting point: 165° C.
Density: 0.91 gr/cm$^3$
*8Ethylene-ethylacrylate copolymer (manufactured by Nippon Unica K. K., DPDJ-6169)
Melt Index: 6 gr/10 min.
Crystal melting point: 90° C.
Density: 0.9 gr/cm$^3$

What is claimed is:
1. A heat-resistant laminate film comprising a gasbarrier layer of a copolymer of vinylidene chloride and at least one comonomer copolymerizable with vinylidene chloride, outer layers of polypropylene and two adhesive layers of polyolefin modified by acid and thermoplastic polyurethane disposed between any of the above layers and bonded with each other, the modified polyolefin adhesive layer being bonded to the outer layer and the thermoplastic polyurethane adhesive layer being bonded to the gas-barrier layer.

2. The heat-resistant laminate film according to claim 1, wherein the polyolefin modified by acid is acid-modified resin prepared by modifying polypropylene with an unsaturated carboxylic acid.

3. The heat-resistant laminate film according to claim 2, wherein the content of the unsaturated carboxylic acid is less than 10 % by weight based on the acid-modified resin.

4. The heat-resistant laminate film according to claim 1, wherein the thermoplastic polyurethane resin is a thermoplastic linear polyurethane elastomer produced by reacting a hydroxycontaining linear compound with an organic diisocyanate.

5. The heat-resistant laminate film according to claim 1, wherein the thickness of the laminate is from 40 to 1000$\mu$, with the thickness of the gas-barrier layer being from 5 to 100$\mu$, the thickness of the outer layer being from 25 to 950$\mu$, the thickness of the adhesive layer of the polyolefin modified by acid from 1 to 50$\mu$ and the thickness of the adhesive layer of the thermoplastic polyurethane resin from 1 to 50$\mu$.

* * * * *